J. H. ABBOTT.
FACING FOR DENTAL BRIDGES.
APPLICATION FILED SEPT. 4, 1915.
1,317,255.
Patented Sept. 30, 1919.
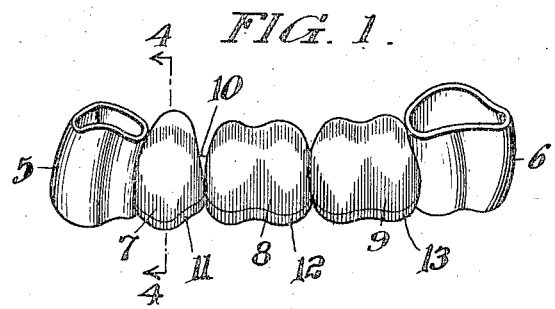
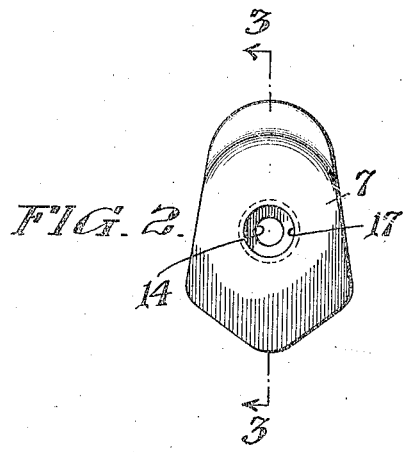
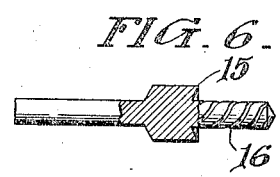
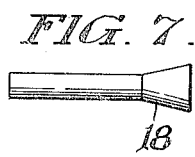
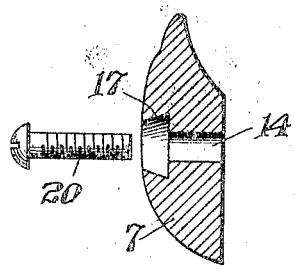
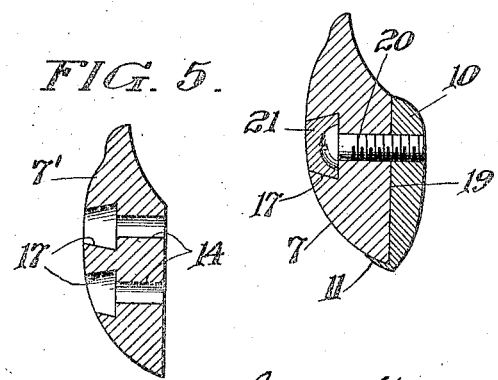
Witnesses
Gertrude Bader.
John J. Kauffman George
Inventor
James Herman Abbott
By Wm Steell Jackson
Attorney

UNITED STATES PATENT OFFICE.

JAMES HERMAN ABBOTT, OF PHILADELPHIA, PENNSYLVANIA.

FACING FOR DENTAL BRIDGES.

1,317,255.      Specification of Letters Patent.      Patented Sept. 30, 1919.

Application filed September 4, 1915. Serial No. 49,028.

*To all whom it may concern:*

Be it known that I, JAMES HERMAN ABBOTT, a citizen of the United States, residing at Philadelphia, in the county of Philadelphia and State of Pennsylvania, have invented a certain new and useful Facing for Dental Bridges, of which the following is a specification.

My invention relates to repair facings or flat back for bridge work.

The purpose of my invention is to provide a facing and method of attachment thereof which shall be capable of ready attachment in place of a broken facing without the use of heat and which at the same time may be applied where the biting surface of the tooth is reinforced and protected by an occlusial surface which is part of a metal bridge or plate.

A further purpose of my invention is to provide for direct application of a facing or "flat back" to a bridge by a bolt or screw which is passed through the facing from the front thereof, preferably using the plate or bridge as a nut therefor, the opening at the front being then closed by a filling matching the tooth. I prefer to recess the countersinking of the hole for the head of the screw annularly for the retention of the filling, preventing admission of moisture and hiding the screw by the enamel or porcelain employed.

I have illustrated my invention by but one form thereof, among the various forms in which it may be practised, selecting one which is practical and efficient and which in manufacture has proved to be inexpensive and at the same time well illustrates the principles of my invention.

Figure 1 is a front elevation of a bridge embodying my invention.

Fig. 2 is a front elevation of a single facing for a tooth prior to its application to the bridge.

Fig. 3 is a vertical central section of the structure shown in Fig. 2, taken upon line 3—3 thereof and with a screw in position to enter the transverse bore thereof.

Fig. 4 is a section of Fig. 1, taken upon line 4—4 thereof.

Fig. 5 is a section similar to Fig. 4 of a long facing having two apertures in it.

Figs. 6 and 7 are side elevations of two of the tools used in preparing my teeth.

Similar numerals of reference indicate like parts in the drawings.

In Fig. 1, I have shown my invention as applied to a brige having anchoring caps or abutments 5, 6 and three intermediate teeth 7, 8 and 9 upon the connecting metal bridge frame 10. The facings forming the teeth are protected, as in ordinary good practice by gold biting or occlusial surfaces 11, 12, 13, which renders the application of mechanically wedged tooth facings impracticable because the biting surfaces interfere with the direct lengthwise movement which wedged facing require.

In the best practice it has been customary to replace broken facings by flowing the metal in about them in the same manner that the facings have been secured to the bridge in the making of the bridge. This has necessitated cutting the anchoring caps and removing the bridge from the mouth, securing the facings, as stated, and then soldering the anchorages and replacing the bridge in the mouth, a troublesome and unsatisfactory series of operations for which the dentists have had difficulty in obtaining commensurate pay.

In the application of my invention to bridges, I prepare teeth of the requisite sizes, shapes and colorings, interrupting the manufacture of the teeth while in the "biscuit" form, to drill or otherwise aperture the teeth at 14, at the same time counterboring them to uniform diameter, preferably by a counterbore drill at 15 upon the drill 16 utilized and then enlarge the counterbore internally to form an undercut surface 17 by means of a hand tool 18, or other suitable apparatus.

It has been my experience that the teeth may be reliably finished in this manner, without requiring any attention to the bore and counterbore after the firing.

I select a facing or "flat back" which is of the shape and color of the facing broken and as nearly the size as possible, grinding it to size, if necessary. I apply cement to the back of the facing, as at 19, and secure it firmly in place upon the frame of the bridge by a screw 20.

The bridge need not be removed from the mouth, as the flat back can be placed in position temporarily before the cement is applied to it and the frame of the bridge at the back can then be marked through the bore 14 for drilling or the frame drilled, while the flat back is in this temporary position, the hole in the bridge can then be tapped for the screw. For these operations existing forms of drill and hand tap may be used.

After the tooth has been cemented, applied and secured to place, by the screw 20, I apply an enamel or porcelain at 21, matching in color the facing and conforming to the contour of the facing. This may be built up in place or separably baked and subsequently cemented in position. It has been my experience that, with carefully matched enamel or porcelain, the filling is not readily detected, even when the facing is dry and is quite invisible when the facing is moist, as is the case in use in the mouth of the patient.

The facings as thus applied, have proved strong and lasting and can be quickly and easily placed at a minimum of expense and of trouble to the patient.

Having thus described my invention, what I claim as new and desire to secure by Letters Patent is:—

1. A bridge facing having a transverse bore throughout the facing, counterbored at the front of the facing and having the counterbore undercut.

2. A bridge facing having a transverse bore, in combination with the bridge frame apertured in line with the bore and a screw passing through the facing and screwing it to the bridge frame, using the bridge frame as a nut for the screw.

3. A bridge facing having a transverse bore and a counterbore on the outer side thereof, in combination with a bridge frame tapped and threaded in line with the bore of the facing and a screw passing through the bore and screwing into the bridge frame.

4. A bridge facing having a transverse bore and undercut counterbore on the outer side thereof, in combination with a bridge frame tapped and threaded in line with the bore of the facing, a screw passing through the bore and screwing into the frame and a filling for the counterbore covering the end of the screw.

5. A bridge facing transversely bored and counterbored, a bridge frame apertured in line with the bore, a screw passing through the bore and retaining the facing to the frame and a filling for the counterbore matching the facing.

6. The process of applying facings to dental bridges which consists in selecting a facing of the proper size and color having a transverse bore and counterbore, drilling and tapping the bridge in line with the bore of the facing, screwing the facing to the bridge by a screw passing through the bore and threaded into the tapped bridge, selecting an enamel to match the facing and filling the counterbore outside of the screw with said enamel.

7. The process of applying facings to dental bridges which consists in placing a facing having a transverse bore and counterbore in position upon the bridge, drilling and tapping the bridge in line with the bore of the facing, cementing the surface of the facing adjoining the bridge, screwing the facing to the bridge by a screw passing through the bore and threaded into the tapped bridge, selecting an enamel to match the facing and filling the counterbore outside of the screw with said enamel.

JAMES HERMAN ABBOTT.

Witnesses:
HELEN I. KAUFFMAN GEORGE,
WM. STEELL JACKSON.

Copies of this patent may be obtained for five cents each, by addressing the "Commissioner of Patents, Washington, D. C."